United States Patent [19]
Keiper

[11] Patent Number: 5,183,077
[45] Date of Patent: Feb. 2, 1993

[54] FLOW CONTROL VALVE

[76] Inventor: Raymond Keiper, 1317 3rd St., North Catasauqua, Pa. 18032

[21] Appl. No.: 803,987

[22] Filed: Dec. 9, 1991

[51] Int. Cl.⁵ .................. F16K 11/087; F16K 5/10
[52] U.S. Cl. ................... 137/625.47; 251/297; 137/556.6; 137/876; 137/887
[58] Field of Search ............. 137/625.47, 556.6, 876, 137/887; 251/297, 315

[56] References Cited

U.S. PATENT DOCUMENTS

| | | | |
|---|---|---|---|
| 2,056,902 | 10/1936 | Longenecker | 137/625.47 X |
| 3,921,955 | 11/1975 | Haddad, Jr. | 251/297 |
| 3,927,693 | 12/1975 | Johnston | 137/625.47 |
| 4,441,524 | 4/1984 | Mese | 137/625.47 |
| 4,570,901 | 2/1986 | Holtgraver | 251/297 X |
| 4,593,717 | 6/1986 | Levasseur | 251/297 X |
| 4,724,867 | 2/1988 | Gillespie . | |
| 4,856,554 | 8/1989 | Heffner . | |
| 4,886,085 | 12/1989 | Miller . | |

OTHER PUBLICATIONS

Pictorial Handbook of Technical Devices, 1971, pp. 374, 375, 378, 379.

Primary Examiner—Arnold Rosenthal
Attorney, Agent, or Firm—Terry M. Gernstein

[57] ABSTRACT

A flow control valve includes a body having a spherical hollow central section into which a spherical central body fits. Three fluid flow conduits are attached to the central section and two flow ports are defined in the central body with a flow passsage connecting the flow ports together. A control knob is attached to the central body and is used to move the central body from one orientation fluidically connecting one fluid conduit to a second fluid conduit to a second orientation fluidically connecting the one fluid conduit to a third fluid conduit. A flow selection plate having a plurality of notches defined therein is slidably mounted on the central section so various amounts of flow can be selected. The flow control valve can be used in a fluid circuit connecting a fluid source to various ones of a plurality of fluid flow driven subsystems.

14 Claims, 7 Drawing Sheets

5,183,077

FLOW CONTROL VALVE

TECHNICAL FIELD OF THE INVENTION

The present invention relates to the general art of flow control elements, and to the particular field of flow control valves.

BACKGROUND OF THE INVENTION

Many workshops include a plurality of fluid-driven systems. Such systems include a shop vacuum, saws, drills, grinders and so forth. These shops generally have a single source of fluid. When each system is used, it must be connected to the fluid source.

Connection of a system to a fluid source can be a difficult procedure in which one system is disconnected from the fluid source and another system is connected to that fluid source. This can be time consuming and may require a worker to stop work to make this disconnection and connection.

Furthermore, once connected, it may be difficult to properly regulate the amount of fluid flowing to the connected system. Still further, it may not be possible to easily connect several systems to a single fluid source while still regulating the amount of fluid flowing to each system.

Accordingly, there is a need for a flow control valve which can be used to efficiently connect a source of fluid to one or several fluid-driven systems, while still providing accurate flow rates for each system.

OBJECTS OF THE INVENTION

It is a main object of the present invention to provide a flow control valve which can be used to efficiently connect a source of fluid to one or several fluid-driven systems.

It is another object of the present invention to provide a flow control valve which can be used to efficiently connect a source of fluid to one or several fluid-driven systems, while still providing accurate flow rates for each system.

SUMMARY OF THE INVENTION

These, and other, objects are achieved by a flow control valve that includes a body having a spherical central section to which three fluid conduits are connected in a pattern to form a planar Y-shape. A control body is located inside the central section and includes two fluid ports and means fluidically connecting such fluid ports together. A control body moving means is fixed to the control body to move that body so one fluid port remains in contact with one of the fluid conduits, while the other fluid port is moved from fluid connection with one conduit to fluid connection with the other fluid conduit. The control body includes a stop element engaging portion so the control valve can be used to meter the amount of fluid flowing between the one port and the fluid conduits.

Several flow control valves can be connected together to form a fluid circuit in which several fluid-driven systems are all connected to a single fluid source. The various valves of the circuit are manipulated to control the amount of fluid flowing to each system.

In this manner, one fluid source can be used to drive several systems, and each system can receive the exact amount of fluid necessary to operate efficiently. However, connection of any single system to the fluid source is easy and expeditious.

BRIEF DESCRIPTION OF THE DRAWINGS FIGURES

DETAILED DESCRIPTION OF THE PREFERRED EMBODIMENT OF THE INVENTION

Figure 1:
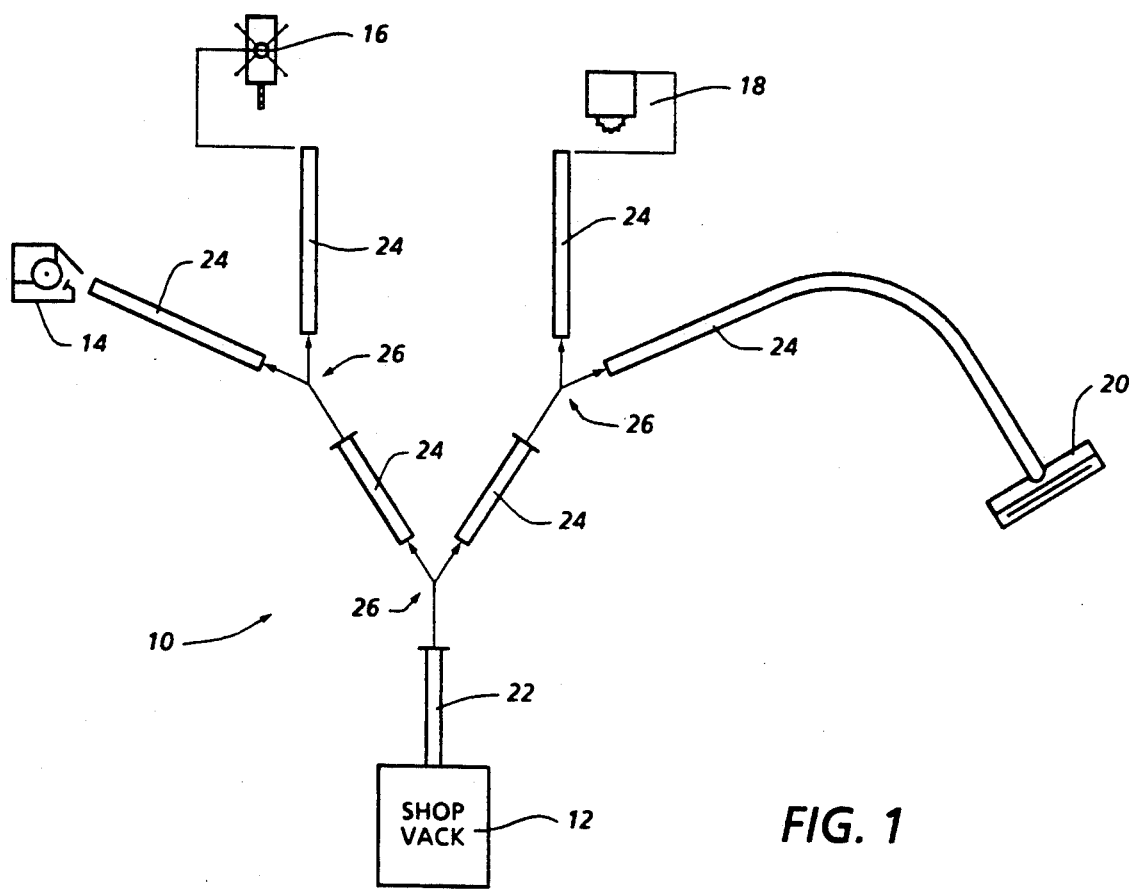
FIG. 1 illustrates a flow circuit in which a single fluid source can supply any or several different fluid-driven systems.

Shown in FIG. 1 is a fluid circuit 10 in which a fluid source 12 is fluidically connected to a plurality of fluid-driven systems, such as a grinder 14, a drill 16, a saw 18 and a shop vacuum attachment 20. As will occur to those skilled in the art, the term "source" can be used to mean a "sink" as well. Just to the source causes fluid to flow in a manner to drive a fluid-driven system.

The fluid source 12 is fluidically connected to the various systems by fluid conduits such as outlet conduit 22 and connection conduits 24. Movement of the fluid through the circuit is controlled by flow control valves 26 fluidically connected to the conduits of the circuit. The flow control valves 26 embody the present invention.

Figure 2:
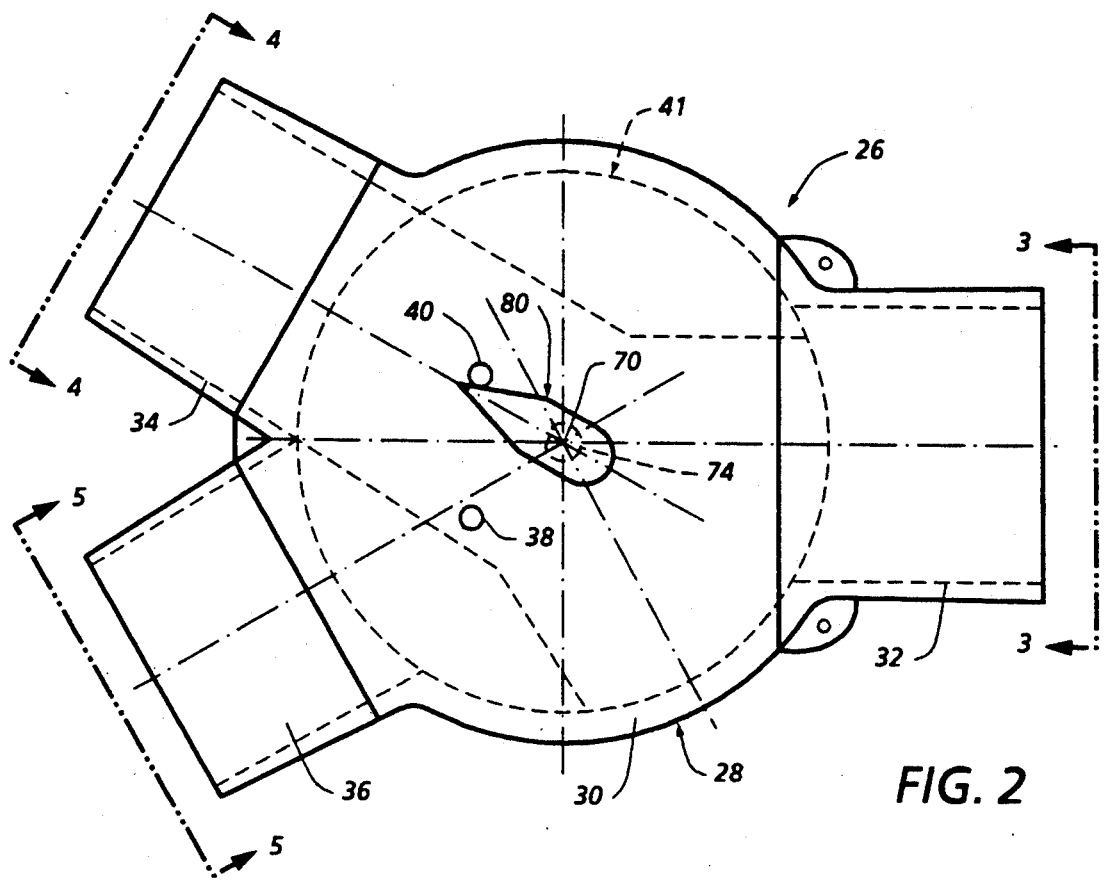
FIG. 2 is a top plan view of a flow control valve embodying the teaching of the present invention.
Figure 3:
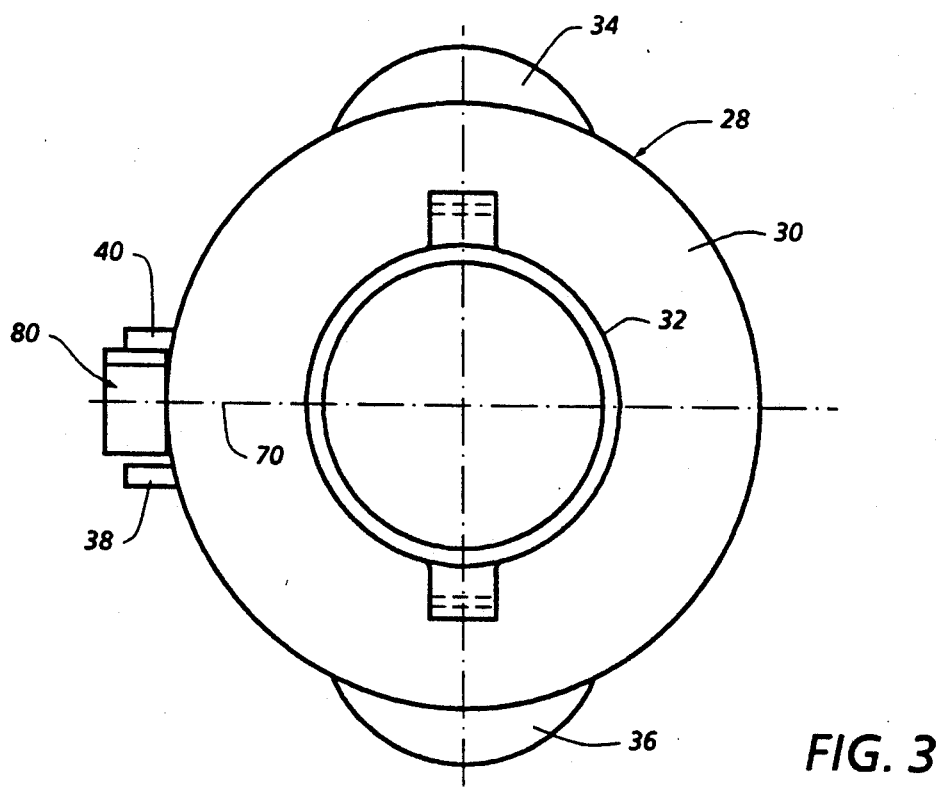
FIG. 3 is an end elevational view of the flow control valve taken from the right hand side of FIG. 2 along line 3—3.
Figure 4:
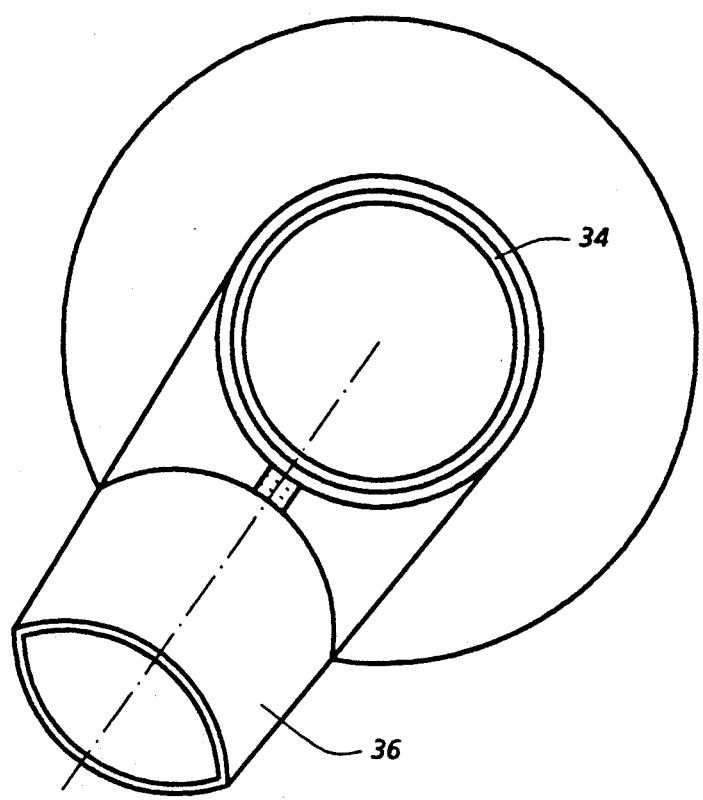
FIG. 4 is an end elevational view of the flow control valve taken from the left hand side of FIG. 2 along line 4—4.
Figure 5:
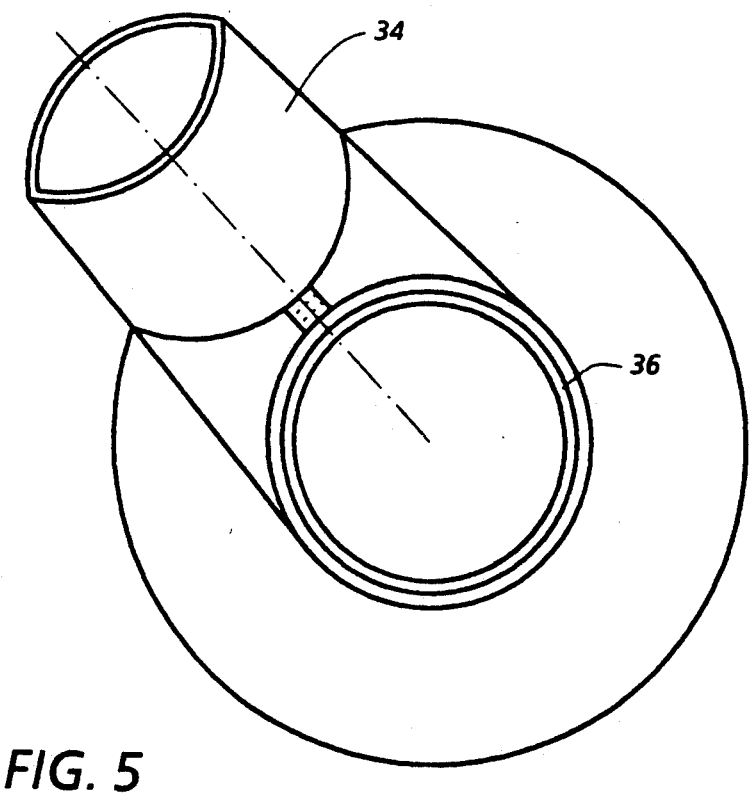
FIG. 5 is an end elevational view of the flow control valve taken from the left hand side of FIG. 2 along line 5—5.

The flow control valve of the present invention is shown in FIGS. 2-4. The flow control valve includes a body 28 having a hollow spherical central section 30 with first, second and third fluid conduits 32, 34 and 36 fluidically connected thereto to transfer fluid to and from the inner volume of the central body. As is shown in FIG. 1, the three fluid conduits are connected to the central body in a Y-shaped pattern. Each fluid conduit 32, 34 and 36 is connected to one of the fluid conduits 22 or 24. The body 28 further includes two stop elements 38 and 40 mounted thereon. The location of the stop elements will be discussed below.

Figure 6:
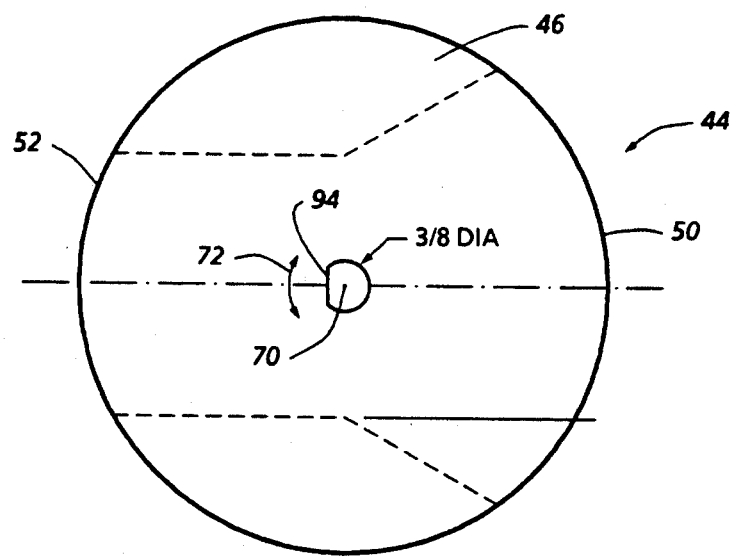
FIG. 6 is a top plan view of a control body used in the flow control valve of the present invention.
Figure 7:
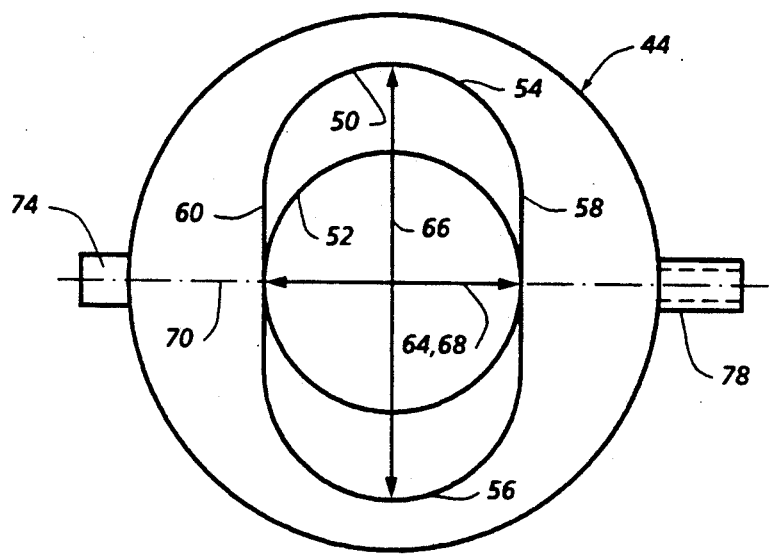
FIG. 7 is an elevational view of the control body taken from the right hand side of FIG. 6.
Figure 8:
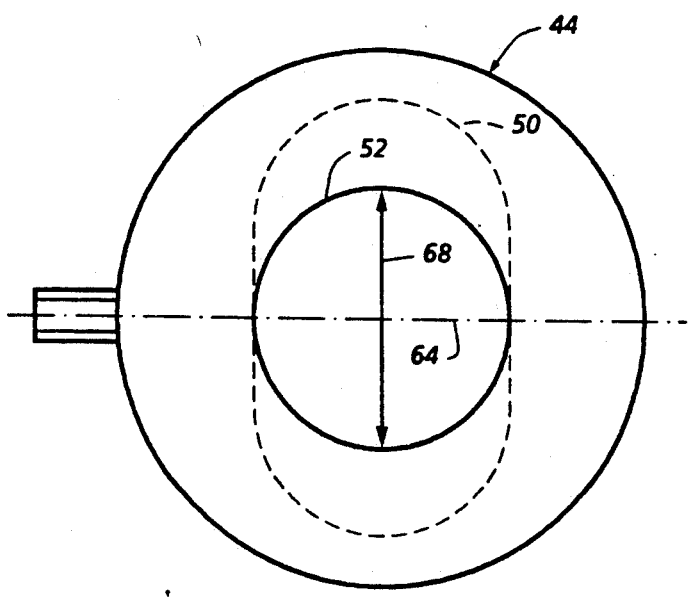
FIG. 8 is an elevational view of the control body taken from the left hand side of FIG. 6.
Figure 9:
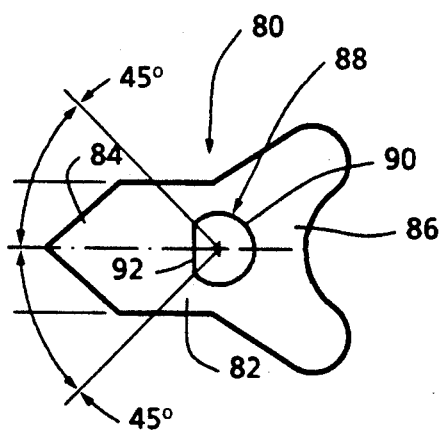
FIG. 9 is a top plan view of a control knob used to control movement of the control body.
Figure 11:
FIG. 11 is an end elevational view of the control knob.
Figure 10:
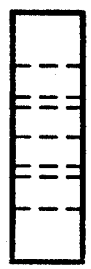
FIG. 10 is an end elevational view of the control knob.
Figure 12:
FIG. 12 is an end elevational view of the control knob.

The flow control valve further includes a central body 44 positioned inside the central section 28. The central body is preferrably steel, and is best shown in FIGS. 6–8. The central body includes a spherical ball 46 having a fluid passage 48 defined therethrough. The fluid passage 48 fluidically connects a first port 50 to a second port 52. The first port 50 is prolate and includes two arcuate ends 54 and 56 connected by two linear sides 58 and 60. The port 50 has a minor axis 64 and a major axis 66. The port 52 is circular and has a diameter 68 equal to the minor axis 64.

The central body 44 is mounted within the central section to rotate about a central axis 70 that is perpendicular to a plane containing the ports 50 and 52 as indicated by double-headed arrow 72 in FIG. 6. A central body moving means includes a post 74 fixed to the central body and extending outwardly of that central body a distance sufficient to extend out of the central section as shown in FIG. 2. The central body further includes a second post 78 which engages the central section to act as a pivot for the central body. The second post 78 can be D-shaped if suitable.

A control knob 80 is fixed to the post 74. The control knob is shown in FIGS. 9–12 and is Y-shaped with a body portion 82 having a pointed end 84 on one end and a C-shaped tail 86 on the other end. A D-shaped hole 88 has an arcuate section 90 and a linear section 92. The post 74 has as planar section 94 and an arcuate section 96, with the post planar portion being located adjacent to the linear section 92 when the control knob is attached to the post. This attachment permits the post 74 to be rotated by movement of the control knob in direction 72. It is noted that the hole and post need not be D-shaped, but can be attached to each other in any suitable manner.

The control knob section 84 contacts the stop elements 38 and 40 to control movement of the control knob. When the knob contacts element 38, port 52 is fluidically aligned with the conduit 36 and port 54 is fluidically aligned with conduit 32 whereby fluid is transferred between conduits 32 and 36. When the knob contacts stop 40, port 52 is fluidically aligned with conduit 34 and port 54 is fluidically aligned with conduit 32 whereby fluid is transferred between conduits 32 and 34 via the fluid path through the central body 44. As can be understood from FIGS. 7 and 8, the relative sizes of the ports 52 and 54 permits the port 54 to remain in fluid contact with the conduit 32 while the port 52 moves from fluid contacting relation between conduit 34 and conduit 36.

Figure 13:
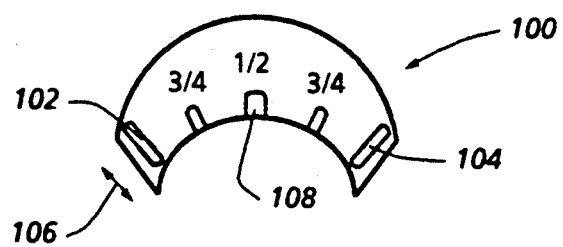
FIG. 13 is a top plan view of an arcuate selection plate for use on the central body to control the amount of fluid flowing from one port to the other.
Figure 14:
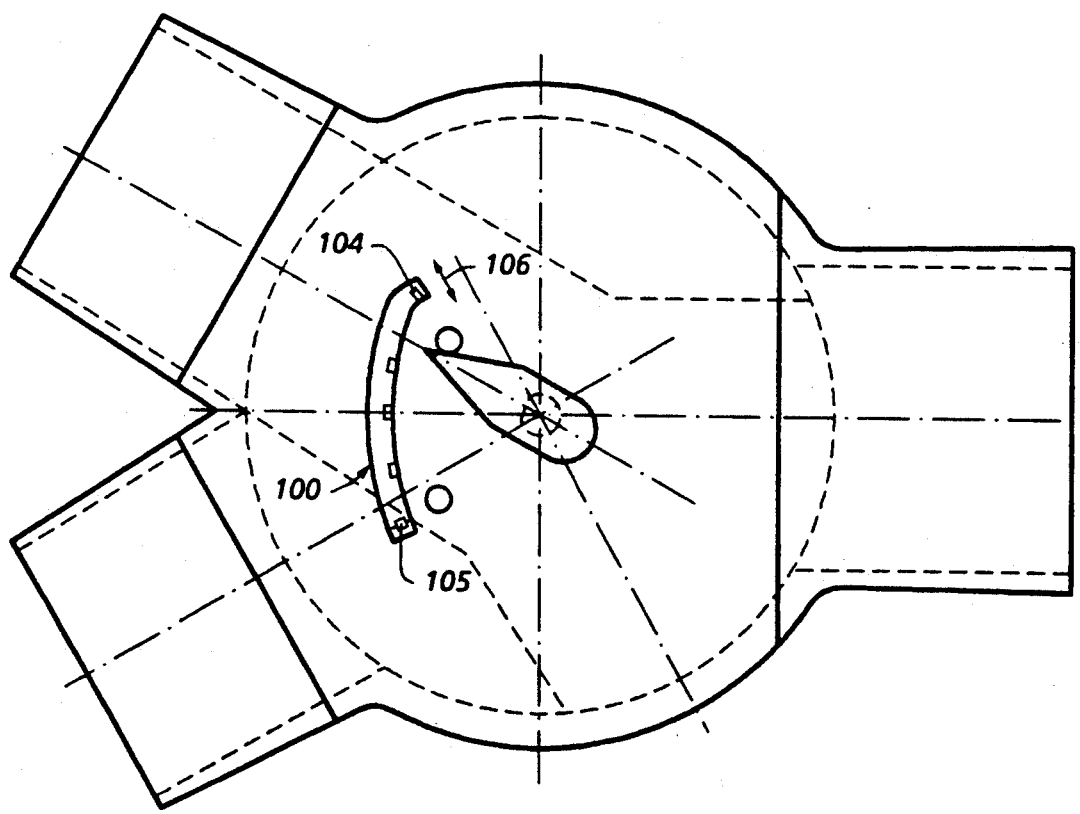
FIG. 14 is a top plan view of the flow control valve having the selection plate mounted thereon.

In order to permit a user the option of controlling the amount of fluid transferred to the selected system, the flow control valve of the present invention includes a flow selection plate 100. The flow selection plate is shown in FIGS. 13 and 14 and is arcuate in two planes to fit onto the spherical central section as shown in FIG. 14. The plate includes two elongate fastener-receiving holes 102 and 104 that slidably mount the plate to the central section adjacent to the control knob. Fasteners, such as headed bolt 105, attach the plate to the central body. The plate can be moved toward and away from the control knob as indicated by double-headed arrow 106. Fasteners, such as headed screws, or the like, fix the plate to the central section in a manner that permits such sliding movement while preventing the plate from being separated from the central section. The plate is thus adapted to move between a first position spaced from the control knob as shown in FIG. 14, and a second position close enough to the control knob to have the pointed end 84 of the control knob overlap the plate.

The plate includes a plurality of notches, such as notch 108, that are each sized to receive the pointed end 84 of the knob 80 when the plate is in the second position. The control plate permits a user to select the amount of fluid flowing between the source and the selected system whereby the exact amount of fluid flow for a system can be selected even though a single source is used in conjunction with several systems, each of which may have different flow requirements.

Figure 15:
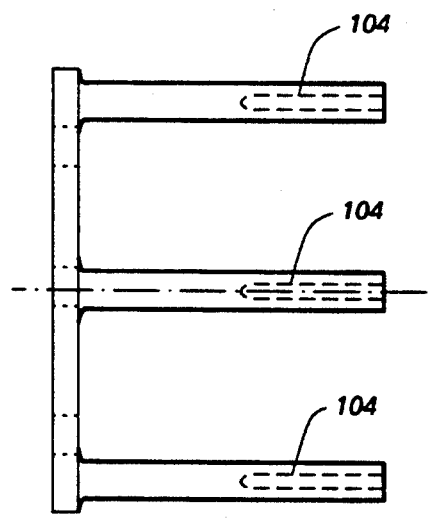
FIG. 15 is an end elevational view of a mounting bracket for use with the flow control valve.
Figure 16:
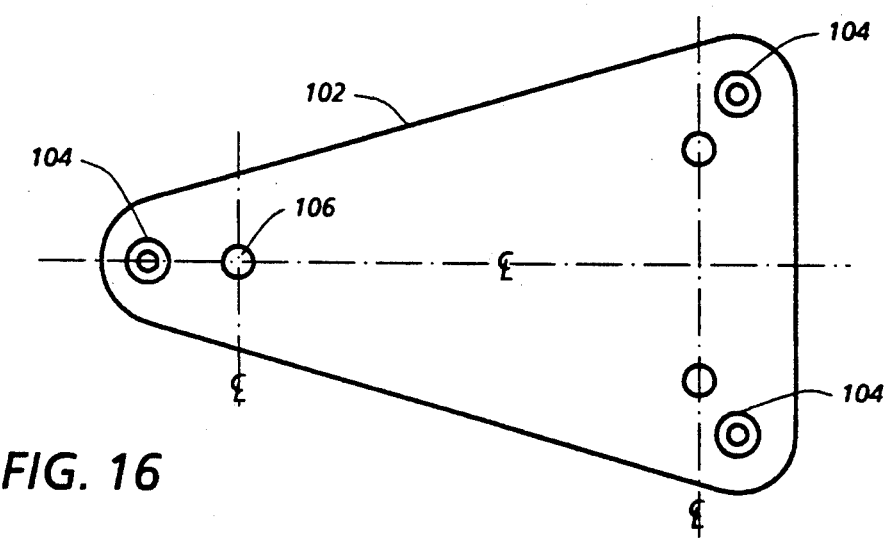
FIG. 16 is an top plan view of a mounting bracket for use with the flow control valve.
Figure 17:
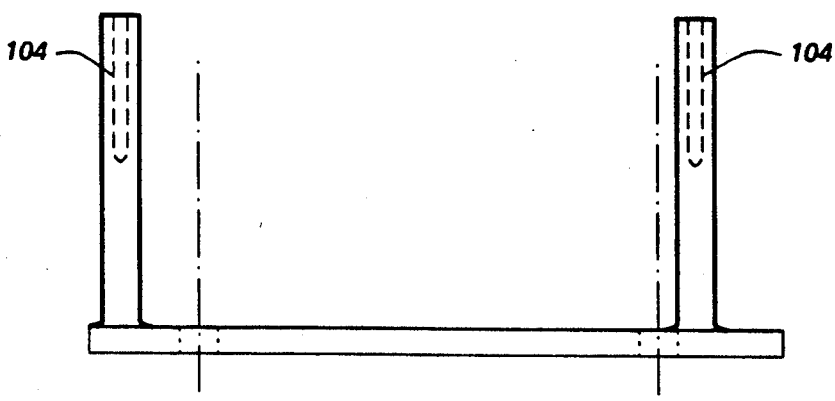
FIG. 17 is a side elevational view of a mounting bracket for use with the flow control valve.

Shown in FIGS. 15, 16 and 17 is a mounting bracket 100 that can be used in conjunction with the flow control valve. The mounting bracket 100 includes a triangular base 102 with valve mounting studs 104 fixed thereto. The studs are positioned adjacent to the apexes of the base. Three fastener-receiver mounting holes 106 are also defined in the base near the mounting studs. The valve body 44 is attached to the bracket by means of the studs 104, and the bracket is mounted on a convenient support by means of the mounting holes 106.

It is understood that while certain forms of the present invention have been illustrated and described herein, it is not to be limited to the specific forms or arrangements of parts described and shown.

I claim:

1. A flow control valve comprising:
   A) a body having a hollow, spherical central section, a first fluid conduit fluidically connected to said central section, a second fluid conduit fluidically connected to said central section, a third fluid conduit fluidically connected to said central section adjacent to said second fluid conduit, two stop elements mounted on top of said central section at locations spaced apart from each other;
   B) a central body positioned within said central section, said central body being spherical and including a first fluid port located adjacent to said first fluid conduit said first fluid port being prolate and having two arcuate ends connected together by linear sections, a second fluid port spaced from said first fluid port, and fluid passage means fluidically connecting said first and second fluid ports; and
   C) central body moving means which includes a post fixedly attached to said central body and extending out of said central section between said two stop elements, a control knob fixed to said post and having a portion that contacts one stop element when said central body is in a first orientation with said first fluid port in fluid communication with said first fluid conduit and said second fluid port in fluid communication with said second fluid port and contacts said second stop element when said central body is in a second orientation with said first fluid port in fluid communication with said first fluid conduit and said second fluid port in fluid communication with said third fluid port, said fluid ports and said fluid conduits being equal in cross section and being congruent when said central body is in either said first or said second orientation.

2. The flow control valve defined in claim 1 wherein said control knob is Y-shaped.

3. The flow control valve, defined in claim 2 further including flow selection means, for holding said central body in a selected orientation between said first orientation and said second orientation.

4. The flow control valve defined in claim 3 wherein said flow selection means includes an arcuate selection plate and plate mounting means movably mounting said selection plate on said central section adjacent to said stop elements.

5. The flow control valve defined in claim 4 wherein said plate mounting means includes two arcuate holes defined in said selection plate.

6. The flow control valve defined in claim 5 wherein said selection plate includes a plurality of notches defined therein to receive a second portion of said control knob.

7. The flow control valve defined in claim 6 wherein said first, second and third fluid conduits are oriented with respect to each other to define a Y shape.

8. The flow control valve defined in claim 7 wherein said post is D-shaped and includes a planar section.

9. The flow control valve defined in claim 8 wherein said control knob includes a D-shaped hole defined therein and sized to snugly receive said post.

10. The flow control valve defined in claim 9 wherein said plate mounting means includes headed fasteners attaching said plate to said central section.

11. The flow control valve defined in claim 1 wherein said first fluid port has a major axis and a minor axis, and said second fluid port is circular and has a diameter, said diameter being equal to said minor axis.

12. The flow control valve defined in claim 10 further including a mounting bracket attached to said central section.

13. The flow control valve defined in claim 12 wherein said mounting bracket includes a triangular base and a plurality of mounting studs mounted on said base near apexes of said base.

14. A flow control valve comprising:
A) a body having a hollow, spherical central section, a first fluid conduit fluidically connected to said central section, a second fluid conduit fluidically connected to said central section, a third fluid conduit fluidically connected to said central section adjacent to said second fluid conduit, two stop elements mounted on top of said central section at locations spaced apart from each other;
B) a central body positioned within said central section, said central body being spherical and including a first fluid port located adjacent to said first fluid conduit, said first fluid port including arcuate ends connected together by linear sections, a second fluid port spaced from said first fluid port, and fluid passage means fluidically connecting said first and second fluid ports; and
C) central body moving means which includes a post fixedly attached to said central body and extending out of said central section between said two stop elements, a control knob fixed to said post and having a portion that contacts one stop element when said central body is in a first orientation with said first fluid port in fluid communication with said first fluid conduit and said second fluid port in fluid communication with said second fluid port and contacts said second stop element when said central body is in a second orientation with said first fluid port in fluid communication with said first fluid conduit and said second fluid port in fluid communication with said third fluid port, said fluid ports and said fluid conduits being equal in cross section and being congruent when said central body is in either said first or said second orientation.

* * * * *